Nov. 13, 1928.                                              1,691,600
C. F. BRUSH, JR., ET AL
METHOD OF MEASURING THE RATE OF MASS FLOW AND THE TEMPERATURE OF
FLUIDS AND APPARATUS THEREFOR
Filed March 24, 1920          2 Sheets-Sheet 1
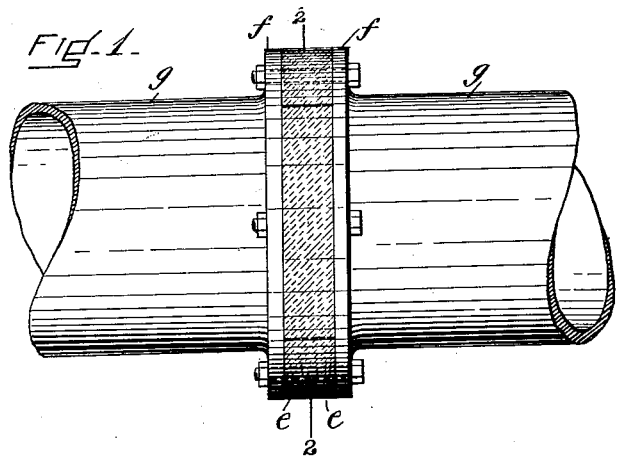
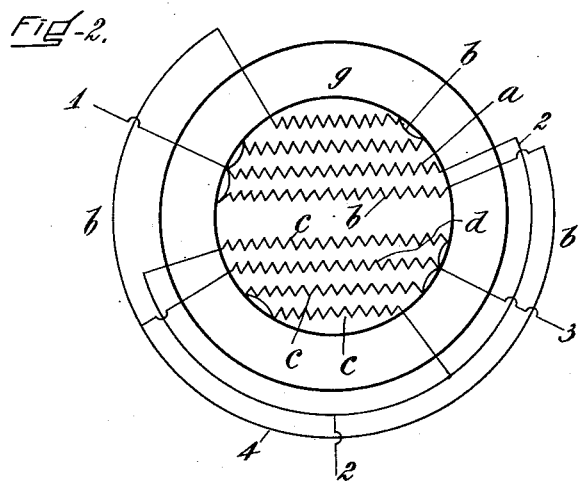
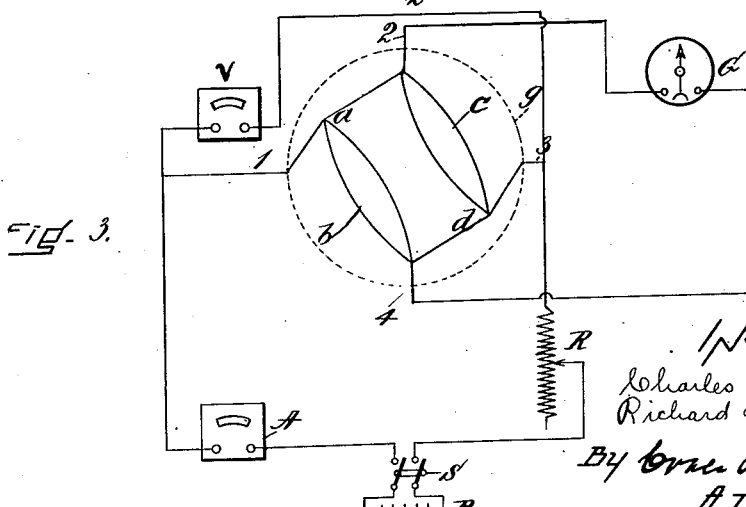
INVENTORS
Charles F. Brush, Jr.
Richard D. Fay
By
ATTORNEYS INVENTORS
Charles F. Brush, Jr.
Richard D. Fay
BY
ATTORNEYS Patented Nov. 13, 1928.

1,691,600

UNITED STATES PATENT OFFICE.

CHARLES F. BRUSH, JR., OF CLEVELAND, OHIO, AND RICHARD D. FAY, OF NAHANT, MASSACHUSETTS, ASSIGNORS, BY DIRECT AND MESNE ASSIGNMENTS, TO THE BRUSH LABORATORIES COMPANY, OF CLEVELAND, OHIO.

METHOD OF MEASURING THE RATE OF MASS FLOW AND THE TEMPERATURE OF FLUIDS AND APPARATUS THEREFOR.

Application filed March 24, 1920. Serial No. 368,455.

Our invention relates to improvements in the art of measuring the rate of flow and other physical conditions of fluid,—one object of the invention being to provide an efficient and improved method and apparatus whereby the rate of flow of fluid and other conditions of fluid including the temperature thereof may be accurately ascertained or determined by electrical observations of variously heated media exposed to the action of the fluid, the physical conditions of which are to be measured.

With this and other objects in view, the invention consists in certain novel features as hereinafter set forth and pointed out in the claims.

We have found that it is possible to measure in a simple manner not only the temperature of a fluid but more particularly the rate at which the fluid is passing through a pipe. Or with suitable auxiliary apparatus the device may be used to control the flow of fluid in the same or in another pipe.

The form of the device which we have in mind is a simple, inexpensive and an accurate instrument of such form that it can be readily included in a system of piping, and by its use a record may be made of the rate at which the fluid passes through the pipe and, also, if desired, of the temperature of the fluid. It is particularly useful in indicating or recording the amount of any fluid, such, for example, as steam, illuminating gas or other gas and water or other liquid or any other gas passing through a pipe and by the use of a number of these devices in a system of pipes records can be obtained of the total flow in each in a given interval with great accuracy and in a simple manner.

The principle which we have utilized in carrying out our invention is that, if a wire forming a portion of an electrical circuit is acted upon by a stream of fluid, the electrical power required to maintain the temperature of the wire a definite amount above that of the fluid in which it is immersed depends upon the rate at which the fluid is flowing past the wire; the greater the velocity of flow past the wire, the greater the power required to maintain this temperature difference, but the power required to maintain this temperature difference will also depend upon the density of the flowing fluid. In other words, the product of the density and velocity of a fluid, i. e. the rate of mass flow through a pipe or the weight passing per unit of time, can be measured by the power required to heat a wire located in the moving fluid.

Our device is so arranged that the temperature of the fluid can also be obtained, if desired, but it is not necessary to know the temperature in order to compute the rate at which the fluid is passing as our instrument is arranged to record directly the rate at which the fluid is passing, that is, the pounds or standard cubic feet per minute or per hour. A suitable integrating mechanism may be incorporated with the recording device, if desired, and thus the total amount of fluid which has passed in any interval of time may be found.

In carrying out our invention we utilize the following elements or their equivalents:

(a) The meter proper which is designed in such a way that it can be inserted in the pipe line carrying the fluid;

(b) A galvanometer connected with the meter and so arranged as to either indicate potential differences or to control the movements of a contact upon (c) A rheostat or resistance coil included in the current supply circuit to the meter; and (d) A special instrument which is designed to indicate or record the rate of mass flow, this instrument being operated by the electric current supplied to the meter.

A convenient form of meter for determining the mass flow of a fluid is shown in the drawings in which—

Figure 1 is a side elevation of a pipe junction to which our meter in its preferred form has been applied.

Fig. 2 is a section on line 2—2 of Fig. 1, the circuits being more or less diagrammatic as will be understood.

Fig. 3 is a diagram showing the circuits, and

Figure 4:
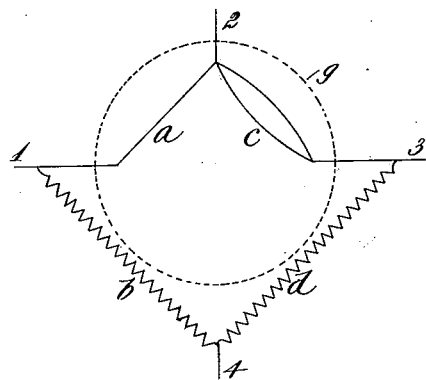
Figs. 4 to 9 show different arrangements of the wiring with relation to the pipe through which the fluid flows.
Figure 5:
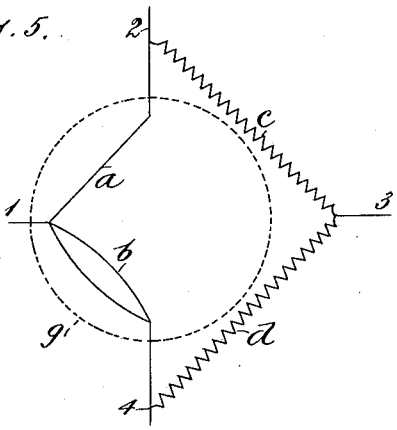

The arrangement we prefer to use is a modification of a Wheatstone bridge in which the four arms are lettered $a$, $b$, $c$ and $d$, and each arm is composed of one or more spans of resistance wire of the same gauge and material or the equivalent thereof and of such material that its resistance rises with a rise of temperature. These arms are so arranged that two or more of them will be exposed to the flow to be measured, being held in place therein by one or more fibre or other rings or gaskets e of insulating material preferably clamped between the flanges f of a pipe junction or otherwise supported in the pipe. The rings between which or in which the wires are held are in the nature of packing rings and the bridge wires are arranged between them if there are two rings, or, if one ring only is used, the ends of the arms forming the bridge may be embedded in it.

Fig. 2 shows a convenient arrangement of the arms within the pipe, so that all will be substantially equally exposed to the mass flow through it, and Fig. 3 shows the preferred circuits outside the pipe. The pipe is lettered g and is indicated by dotted lines in this as in other views. G is a galvanometer connected to the points 2 and 4 to form the bridge. Current is supplied at the points 1 and 3 by a storage battery or other source of current B which is connected with a special instrument similar in construction to an ammeter, which is lettered A, a voltmeter V and an adjustable resistance or rheostat R through the switch S.

The arms $a$ and $d$ are each of a single wire, while in the construction of Fig. 3 the arms $b$ and $c$ are of two wires in parallel, the arms $a$ and $d$ being somewhat less than one half the length of each of the branch wires in the arms $b$ and $c$, depending upon the temperature at which it may be desired to operate the exposed conductors of the bridge.

As arranged in Figs. 2 and 3, a current of electricity passing through the circuit will divide between the arms $a$ and $b$. When there is no potential difference between 2 and 4 the resistance of $a$ and $b$ must be equal as in a Wheatstone bridge with equal ratio arms. Since arm $a$ will carry substantially twice the current of each branch of the arm $b$ and since all the active wires of this form of the device are of the same cross section, the temperature of wire $a$ will be higher than that of the wires in branch $b$ (other things being equal) and its resistance per unit length will be greater. But the wire $a$ is less than half the length of each wire in the arm $b$ so that when the resistance of arm $a$ and arm $b$ are equal, as must be the case when there is no potential difference between the points 2 and 4, the temperature of the arms $a$ and $b$ will have a definite ratio to each other, the magnitude of this ratio depending upon the amount by which the length of the wire in arm $a$ is less than half the length of each wire in arm $b$. Since arms $c$ and $d$ are electrically similar to arms $a$ and $b$, respectively, the same reasoning applies to them.

The fluid passing through the meter will take more or less heat from the wires in the meter depending on the velocity and density of the fluid. If the velocity of the fluid or its density be increased, more heat will be taken from the wires so that their temperatures will be lowered, that of the arm $a$ more than that of the arm $b$ since the temperature of the arm $a$ was originally higher than that of the arm $b$. Thus the temperature ratio between the arms $a$ and $b$ (or $c$ and $d$) which was shown to be necessary to produce no potential difference between the points 2 and 4 will no longer exist, and the galvanometer G will be deflected. The rheostat controlling the current through the meter is then readjusted so as to increase the current through the meter until again there is no potential difference between the points 2 and 4, at which moment the original temperature ratio will be restored. We have found that under these circumstances the current supplied to the meter will be a measure of the rate of mass flow through the meter, no matter what the temperature of the fluid may be, and the electrical resistance of the meter between the points 1 and 3 is a measure of the temperature of the ambient fluid. In other words, by the use of this type of electrical circuit we are able to measure independently the rate of mass flow and temperature of the fluid.

The resistance which measures the temperature of the ambient fluid may be determined by dividing the potential drop between the points 1 and 3 by the current supplied to the meter. This may be done in any convenient way automatically or otherwise by instruments known to those skilled in the art.

If the device is used for controlling the flow, the current supplied to the meter (the resistance of the various wires of which are of course known) is given a value corresponding to the desired flow, whether constant or variable, by any convenient means. The galvanometer may be utilized to control the operation of valve-operating means but this forms no part of our present invention.

The arrangement above described is an efficient means for measuring independently the temperature and rate of mass flow of a fluid, but we do not mean to confine ourselves to the precise arrangement of bridge wires shown in Figs. 2 and 3. We have therefore shown in Figs. 4 to 9 other arrangements which are practicable, although still other arrangements might be used.

In Fig. 4 only two branches $a$ and $c$ are exposed to the fluid flow, the other two arms $b$ and $d$ having fixed and constant resistances and being outside of the pipe, the flow in which is to be measured. Or (see Fig. 5) branches $a$ and $b$ may be exposed to the fluid, while $c$ and $d$ are of fixed and constant resistance and placed outside the pipe.

Figure 6:
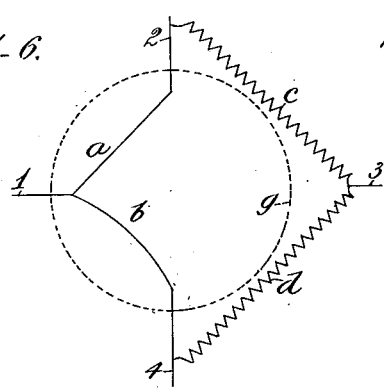

In Fig. 6, *a* and *b* are the active arms but instead of making one arm of two wires, both are made of single wires of the same size but one longer than the other, and the resistances of the external arms so related that a balance will be produced by the heating action of the current through the bridge.

Figure 7:
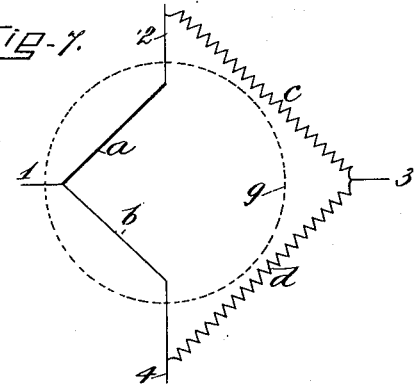

Still another arrangement is shown in Fig. 7 in which one of the active arms is made of smaller wire than the other.

Figure 8:
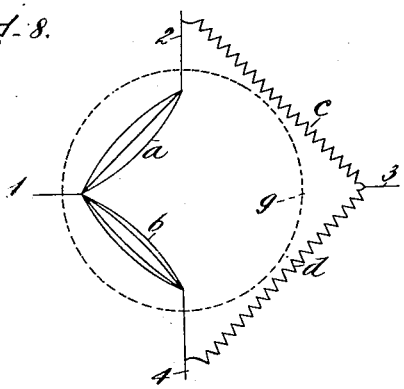

In Fig. 8, the two active arms are both made up of multiple wires of equal size, but one branch is composed of more wires than the other.

Figure 9:
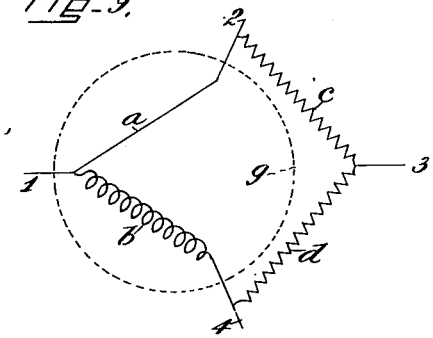

In Fig. 9, an arrangement is shown in which one of the active arms *a* is at approximate right angles to the flow and the other *b* is inclined at an angle to the flow.

In general, the arrangement of the bridge wires may be such that:

(1) At least two branches forming part of an electric circuit be exposed to the flow to be measured, and that (2) The electrical resistance of these two branches varies with the temperature in approximately the same manner, and that (3) The branches shall be so designed that an increase in the current in the main circuit will increase the temperature of these two branches by different amounts either (*a*) By having more current per unit area of cross section of conductor in one arm than in the other, or (*b*) By having one branch more directly exposed to the flow than the other (as by having one branch more nearly at right angles to the flow) or (*c*) By having a combination of (*a*) and (*b*); and that (4) There shall be means for determining when the resistance of and current in one of the two branches bear a definite predetermined relation to the resistance of and current in the other branch, and that (5) The difference in temperature produced by the unequal heating in the two branches shall operate to give the desired ratios of resistance and current.

The galvanometer or similar device which we use can be of any commercial form which will indicate the direction and approximate magnitude of the potential difference between its terminals. A deflection in one direction will thus indicate that the current through the meter must be reduced by increasing the resistance of the rheostat or a deflection in the opposite direction will show that the resistance must be reduced. We have found it convenient to arrange this device so that the galvanometer needle will cooperate with a contact on one side or the other of its swing and control a local circuit for governing automatically the movements of the rheostat, or this may be done mechanically, but these devices form no part of our present invention, and hence need no further explanation herein.

The rheostat which we show can be of the usual construction and can be operated by hand to increase or decrease the resistance in the current supply circuit following the indications of the galvanometer or automatically as above mentioned.

The instrument to indicate or record the mass flow may be any suitable device for measuring an electric current, such as an ammeter having a special scale designed to read mass flow directly and connected so as to measure the current supplied to the meter. Since we have found that the current supplied to the meter when in balance depends on the product of the velocity, specific heat, and density of the fluid under consideration, it is evident that if one of these variables be known, the product of the other two is determined, and if two be known, the remaining one is determined. Therefore the mass flow, which is the product of the density and velocity, may be found if the specific heat be known, or if the velocity be known the product of the specific heat and density, (which in some cases is an indication of the composition of a mixture), may be found. Since the temperature of the fluid may be determined independently of the velocity, specific heat, and density, the pressure of the fluid may be found from the density and temperature, if the velocity and specific heat be known. To determine any of these conditions it would be necessary, of course, to obtain special calibration data for the device which normally is calibrated to read mass flow of a specific fluid.

In using the word "pipe" we mean to include any form of conveyor through which the flow of a fluid may pass.

What we claim as our invention is:—

1. In the herein described method of measuring the rate of flow and other physical conditions of fluid, the steps consisting in exposing to the fluid, a conductor comprising a plurality of members so connected as to form parts of a Wheatstone bridge at least two of which members differ relatively in electrical resistance, passing an electric current through said conductor whereby members of said conductor are heated to relatively different temperatures, regulating the electric heating current until a definite difference of potential between two points of said conductor is brought about, and measuring the current necessary to maintain such difference of potential.

2. In apparatus of the character described, the combination of a Wheatstone bridge including at least two electrical conductors composed of such material that the electrical resistance thereof will rise with rise of temperature and differing relatively in electrical resistance, means whereby said conductors may be exposed to fluid to be measured, means whereby said bridge may be included in an electric circuit, means for controlling the current in said circuit to effect balancing of said bridge by unequal electrical heating of said conductors, and means for measuring the electric current necessary to establish and maintain the balance of the bridge.

3. In apparatus of the character described, the combination of a Wheatstone bridge including at least two electrical conductors composed of such material that the electrical resistance thereof will rise with rise of temperature and differing relatively in electrical resistance, means for exposing said conductors to fluid to be measured, means for passing an electric current through said bridge, means for controlling said current to effect balancing of said bridge by unequal electrical heating of said conductors, means for measuring the current necessary to establish and maintain the balance of the bridge, and means for measuring the voltage across a portion of the circuit including said bridge,— whereby the temperature of the fluid may be deduced from the measurements of the current and voltage.

4. In the herein described method of measuring the rate of flow and other physical conditions of fluid, the steps consisting in exposing to the action of fluid, a plurality of conductors initially differing relatively in resistance and forming parts of a Wheatstone bridge, electrically heating the conductors of said bridge, and measuring the electric heating current necessary to establish and maintain a definite difference of potential between the sides of the bridge.

5. In the herein described method of measuring the rate of flow and other physical conditions of fluid, the steps consisting in exposing to the fluid, a conductor comprising a plurality of members so connected as to form parts of a Wheatstone bridge at least two of which members differ relatively in electrical resistance, passing an electric current through said conductor whereby members of said conductor are heated to relatively different temperatures, regulating the electrical heating current until a definite difference of potential between two points of said conductor is brought about, and measuring the resistance of a part of the circuit including said conductor, whereby the temperature of the fluid may be ascertained.

6. In the herein described method of measuring the rate of flow and other physical conditions of fluid, the steps consisting in exposing to the fluid a conductor comprising a plurality of members so connected as to form parts of a Wheatstone bridge, said members being so proportioned relatively to each other that when an electric current is passed through said conductor some of said members will be heated to a higher temperature than other members, passing an electric current through said conductor, regulating said current until a predetermined difference of potential exists between two points of said conductor, measuring said electric current, whereby the rate of mass flow may be deducted.

7. In the herein described method of measuring the rate of flow and other physical conditions of fluid, the steps consisting in exposing to the fluid a conductor comprising a plurality of members so connected as to form parts of a Wheatstone bridge, said members being so proportioned relatively to each other that when an electric current is passed through said conductor some of said members will be heated to a higher temperature than other members, passing an electric current through said conductor, regulating said current until a predetermined difference of potential exists between two points of said conductor, measuring the electrical resistance of a part of the circuit including said conductor and from its value deducing the temperature of the fluid.

8. In the herein described method of measuring the rate of flow and other physical conditions of fluid, the steps consisting in exposing to the fluid, a conductor comprising a plurality of members so connected as to form parts of a Wheatstone bridge at least two of which members differ relatively in electrical resistance and are composed of such material that the electrical resistance thereof will rise with rise of temperature, passing an electric current through said conductor whereby members of said conductor are heated to relatively different temperatures, regulating said heating current until a predetermined relation exists between the resistances of said members of said conductors as indicated by the balancing of said Wheatstone bridge, and measuring the current required to maintain said bridge in a balanced condition.

9. In the herein described method of measuring the rate of flow and other physical conditions of fluid, the steps consisting in exposing to the fluid, a conductor comprising a plurality of members so connected as to form parts of a Wheatstone bridge at least two of which members differ relatively in electrical resistance and are composed of such material that the electrical resistance thereof will rise with rise of temperature, passing an electric current through said conductor whereby members of said conductor are heated to relatively different temperatures, regulating said heating current until a predetermined relation exists between the resistance of said members of said conductors as indicated by the balancing of said Wheatstone bridge, and measuring the electrical resistance of a portion of the circuit including said conductor.

CHARLES F. BUSH, Jr.
RICHARD D. FAY.